Patented Feb. 12, 1935

1,991,108

UNITED STATES PATENT OFFICE 1,991,108

METHOD OF REMOVING THE CATALYST FROM A SPENT LIQUOR RESULTING FROM THE ESTERIFICATION OF CELLULOSE IN FIBROUS FORM

Carl J. Malm, Kingsport, Tenn., and Gale F. Nadeau, Rochester, N. Y., assignors to Eastman Kodak Company, Rochester, N. Y., a corporation of New York No Drawing. Application July 28, 1933, Serial No. 682,724

7 Claims. (Cl. 260—102)

The present invention relates to the removal from a substantially anhydrous liquid particularly an anhydrous spent cellulose esterification liquor of any mineral acid catalyst or mineral salt catalyst present therein, by means of an adsorbing material particularly a porous carbon such as activated charcoal.

In the preparation of cellulose esters in fibrous form, there usually results a large volume of the spent esterification liquor from which as a rule the principal ingredients are separated.

The usual practice heretofore in the reclamation of this spent liquor was to subject it to fractional distillation to separate the various liquids which were present therein. The mineral acids which are employed as catalysts are non-volatile and during this distillation they will accumulate in the base of the still causing considerable sludging which interferes with the transference of heat and causes corrosion of the still base. The difficulties arising from the accumulation of sludge in the still pot is not remedied by neutralization of the mineral acids for instance by the addition of sodium acetate to the liquor before distillation.

In the invention of F. J. Hopkinson and C. R. Fordyce which is disclosed and claimed in their application Serial No. 682,726 filed of even date, in which the reuse of a considerable portion of the spent esterification liquor in a subsequent esterification is contemplated, it is desirable to remove the catalyst therefrom to assure the presence of the desired proportion of catalyst in the subsequent esterification.

One object of our invention is to provide a method of separating mineral acid or mineral salt catalyst from a substantially anhydrous liquid particularly the spent liquor resulting from the esterification of cellulose in fibrous form. Another object of our invention is to make possible the reclamation of the spent liquor by distillation without the danger of sludge formation in or corrosion of the still pot. A further object of our invention is to permit accurate control of amount of catalyst employed in the cyclic process of esterifying cellulose which was discovered by Hopkinson and Fordyce referred to above. Other objects will appear herein.

We have found that mineral acid which has been employed as the catalyst in the esterification of cellulose in fibrous form may be removed from the spent esterification liquor resulting from that process by contacting it with an adsorbing material. This contacting may be very easily and conveniently performed by percolating the liquor through a column of porous carbon, the liquor preferably being allowed to trickle down through the column. Large volumes of the spent liquor can by this means be treated with comparatively small quantities of carbon.

The present invention very effectively removes the catalyst from esterification baths and is applicable to a bath containing any mineral acid catalyst or mixture; in all cases we were able to effect substantially complete removal of the catalyst from the mixture by contacting it with porous carbon such as activated carbon.

After the adsorbing power of the adsorbent material is spent, the recovery and restoration of this property is comparatively simple. This restoration was performed by removing the non-solvent and the acid which was retained by the adsorbent with a current of hot air. The adsorbed catalyst which was retained by the charcoal was removed therefrom by washing the charcoal with water and then removing the moisture therefrom by means of a current of warm, dry air.

Other adsorbing materials than the porous carbon such as silica gel or fuller's earth are also well adapted for removing mineral acid or mineral salt catalysts from anhydrous spent liquids containing them such as spent esterification baths in accordance with the present invention.

The following examples illustrate processes embodying our invention:

Example I 250 cc of spent esterification liquor from the fibrous preparation of cellulose acetate propionate with a bath consisting of a mixture of propionic acid, acetic anhydride, ethylene dichloride, Stoddard solvent (the specifications of which solvent are given in Bureau of Standards bulletin CS 3—28) and perchloric acid as the catalyst, which spent liquor may consist of 120 cc Stoddard solvent, 5 cc ethylene dichloride, 60 cc acetic acid, 65 cc propionic acid and .1 cc perchloric acid was allowed to percolate through a 6 inch column of activated charcoal. The filtrate was tested for the presence of perchloric acid and no evidence of the presence of that acid was found.

Example II 250 cc of a spent esterification liquor having substantially the same composition as that of Example I, except that sulfuric acid instead of perchloric acid was employed as the catalyst was percolated through a 6 inch column of activated charcoal in the same manner as in the previous example. A sample from the filtrate was tested for the presence of sulfuric acid and no evidence of the presence of that acid was found.

*Example III*

To ascertain that the present invention will remove the sulfuric acid even when it combines chemically with acetic acid or anhydride, a substantial amount of sulfoacetic acid was added to the filtrate from the previous example and the whole was again percolated through the activated charcoal employed in Example II without regeneration. It was found that all the sulfoacetic acid present had been removed.

*Example IV*

A spent esterification liquor from the fibrous acetylation of cellulose containing acetic acid, sulfuric acid and carbon tetrachloride to which acetyl sulfuric acid was added was percolated through the charcoal employed in the processes of Example II and III without regeneration. The filtrate was found to be free of both sulfuric and acetyl sulfuric acid.

The amount of the mineral acid present after the treatment with an adsorbent may be determined by titrating the filtrate with an acetic acid solution of sodium acetate, using benzoyl auramine or crystal violet for the indicator. In the case of each of the filtrates in the above examples one drop of 0.1 N sodium acetate solution changed the color of the indicator thus showing the absence of substantially mineral acid. It was determined in previous work that the accuracy of this titration is not impaired by the presence of either Stoddard solvent, acid anhydride or ethylene chloride in the indicating liquid.

Although the present invention has been described particularly by the removal of catalyst from spent esterification baths, it may be employed for the removal of materials similar in nature to this catalyst from any substantially anhydrous liquid of a similar nature from which such removal is desired.

Where the term "substantially anhydrous spent esterification baths" is employed herein, it refers to that type of bath generally regardless of whether the esterification resulted in a dope or whether the cellulose ester produced was in fibrous form. For example, especially in the case of the mixed esters such as cellulose acetate propionate, which are acetone-soluble even though fully esterified, the ester is sometimes precipitated from the "dope" or esterification bath without the intermediate step of hydrolysis as the ester already has the desired solubility. The spent esterification bath resulting from the precipitation of this anhydrous dope in an anhydrous non-solvent such as an ester containing 3 to 5 carbon atoms, or from the precipitation into a high boiling aliphatic hydrocarbon, these being the inventions of C. J. Malm and C. R. Fordyce, and are disclosed and claimed in their applications Serial Nos. 553,646 filed July 28, 1931 and 717,083 filed March 31, 1934 respectively, can be freed from catalyst by the present process.

Any spent liquor from a process of esterifying cellulose in fibrous form, unless water has been added thereto, may be subjected to treatment by our invention regardless of whether benzene, carbon tetrachloride, an ether having a boiling point about 70° C. (disclosed and claimed in Malm and Fletcher application serial No. 590,509 filed January 13, 1933) or an aliphatic hydrocarbon and an homogenizer (disclosed and claimed in Minsk, Kenyon and Gray application, Serial No. 671,900 filed May 19, 1933), is employed as the non-solvent therein.

It is to be understood that where the term "spent esterification liquor" is employed herein, it refers to both liquor separated off from the ester in a fibrous process and to the liquid mass from which the ester is precipitated subsequent to a dope esterification, which latter also contains the liquid employed for the precipitation in addition to the true spent esterification liquor. Where the term "mineral acid" is employed herein, it is to be understood as including the acids per se and also the salts thereof.

Any of the porous carbons may be employed in a process in accordance with the present invention however the activated carbons, such as activated charcoal, due to their power of adsorption are particularly suitable in this connection. Although none of the members of this class which have been tried have been found to be unsuitable, the activated carbons were found to exert the same effect using a much less quantity than in the case of the porous carbons which have not been activated.

Of the activated carbons, those prepared from wood charcoals such as from cocoanut-shells or from hardwood are preferred. Activated charcoal may be prepared by carbonizing the raw material at a high temperature and cooling out of contact with air, however charcoals may be activated by chemical treatment either during their preparation or after their formation. Wood charcoal which has been activated by heating to red heat where there is only a limited access of air thereto, is eminently suited for employment in the present invention.

We claim as our invention:

1. The method of removing mineral acid from a substantially anhydrous liquor remaining after the esterification of cellulose containing the acid in solution which comprises contacting that liquor with an adsorbent for the acid which is chemically inert thereto.

2. The method of removing mineral acid from a substantially anhydrous liquor remaining after the esterification of cellulose containing the acid in solution which comprises contacting that liquor with a porous carbon which is chemically inert thereto.

3. The method of removing mineral acid from a substantially anhydrous liquor remaining after the esterification of cellulose containing the acid in solution which comprises contacting that liquor with an activated charcoal which is chemically inert thereto.

4. The method of removing mineral acid from a substantially anhydrous liqueur remaining after the esterification of cellulose containing the acid in solution which comprises percolating the liqueur through an adsorbent for the acid which is chemically inert thereto.

5. The method of removing the sulfuric acid or its derivatives present in a substantially anhydrous liquor which comprises contacting that liqueur remaining after the esterification of cellulose with an adsorbent for the sulfuric acid which is chemically inert thereto.

6. The method of removing the sulfuric acid or its derivatives present in a substantially anhydrous liquor which comprises containing that liquor remaining after the esterification of cellulose with a porous carbon which is chemically inert thereto.

7. The method of removing the sulfuric acid or its derivatives present in a substantially anhydrous liquor which comprises contacting that liquor remaining after the esterification of cellulose with activated charcoal which is chemically inert thereto.

CARL J. MALM.
GALE F. NADEAU.